United States Patent [19]
Hoffman et al.

[11] Patent Number: 6,094,435
[45] Date of Patent: Jul. 25, 2000

[54] SYSTEM AND METHOD FOR A QUALITY OF SERVICE IN A MULTI-LAYER NETWORK ELEMENT

[75] Inventors: Don Hoffman, Portland, Oreg.; Shree Murthy, Sunnyvale; Asad Khamisy, Fremont, both of Calif.

[73] Assignee: Sun Microsystems, Inc., Mountain View, Calif.

[21] Appl. No.: 08/885,258

[22] Filed: Jun. 30, 1997

[51] Int. Cl.[7] .................................................. H04L 12/56
[52] U.S. Cl. ........................................ 370/414; 370/468
[58] Field of Search ..................................... 370/412, 413, 370/414, 417, 418, 415, 416, 400, 401, 429, 468

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/418 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,309,437 | 5/1994 | Perlman et al. | 340/827 |
| 5,313,454 | 5/1994 | Bustini et al. | 370/13 |
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |

(List continued on next page.)

FOREIGN PATENT DOCUMENTS 13016  6/1998  WIPO .

OTHER PUBLICATIONS

Microsoft Press, "Microsoft Computer Dictionary Fourth Edition", Microsoft Corporation, 1999, 4 pages.

"Load Balancing for Multiple Interfaces for Transmission Control Protocol/Internet Protocol for VM/MVS", IBM Technical Disclosure Bulletin, 38(9): 7–9 (Sep., 1995).

T. Nishizono et al., "Analysis on a Multilink Packet Transmission System", Electron. Commun. JPN 1, Commun., (USA), 68(9): 98–104 (Sep., 1985).

*Primary Examiner*—Chau Nguyen
*Assistant Examiner*—Soon-Dong Hyun
*Attorney, Agent, or Firm*—Blakely Sokoloff Taylor & Zafman

[57] ABSTRACT

A multi-layer network element for forwarding received packets from an input port to one or more output ports with quality of service. When output queues exceed or meet a threshold value below the queue's capacity packets are ramdomly discarded. When the queue becomes full, the network element determines which flow caused the queue to overflow. The priority of that flow is lowered. In a multicast packet, the packet may have different priorities at each output port. Scheduling of multiple output queues at each output port uses a weight round robin approach that allocates a weight portion of packets to transmit at each time interval. A packet is not interrupted during its transmission, even if the weight portion is met during a packet's transmission. The excess number of bytes transmited as a result of not interrupting the packet are accounted for in the next round.

4 Claims, 8 Drawing Sheets

U.S. PATENT DOCUMENTS

| | | | |
|---|---|---|---|
| 5,394,402 | 2/1995 | Ross | 370/94.1 |
| 5,396,602 | 3/1995 | Amini et al. | 395/325 |
| 5,402,415 | 3/1995 | Turner | 370/390 |
| 5,404,538 | 4/1995 | Krappweis, Sr. | 395/725 |
| 5,410,540 | 4/1995 | Aiki et al. | 370/390 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake, Jr. et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 340/402 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmaer et al. | 395/600 |
| 5,557,610 | 9/1996 | Calamvokis et al. | 370/60.1 |
| 5,561,666 | 10/1996 | Christensen et al. | 370/434 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,570,365 | 10/1996 | Yodhida | 370/85.6 |
| 5,572,522 | 11/1996 | Calamvokis et al. | 370/395 |
| 5,574,861 | 11/1996 | Lorvig et al. | 395/200.06 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,497 | 4/1997 | Gallagher et al. | 370/394 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,710 | 5/1997 | Mandal et al. | 364/514 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,348 | 3/1998 | Basso et al. | 370/384 |
| 5,724,358 | 3/1998 | Headrick et al. | 370/418 |
| 5,726,977 | 3/1998 | Lee | 370/235 |
| 5,734,651 | 3/1998 | Blakeley et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,559 | 7/1998 | Frazier et al. | 395/200.13 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/395 |
| 5,835,491 | 11/1998 | Davis et al. | 370/386 |
| 5,838,677 | 11/1998 | Kozaki et al. | 370/389 |
| 5,838,681 | 11/1998 | Bonomi et al. | 370/395 |
| 5,856,977 | 1/1999 | Yang et al. | 370/411 |
| 5,859,849 | 1/1999 | Parks | 370/395 |
| 5,867,677 | 2/1999 | Tsukamoto | 395/311 |
| 5,872,783 | 2/1999 | Chin | 370/395 |
| 5,872,904 | 2/1999 | McMillen et al. | 395/182.02 |
| 5,875,464 | 2/1999 | Kirk | 711/129 |
| 5,898,687 | 4/1999 | Harriman et al. | 370/390 |
| 5,931,980 | 11/1998 | Varma et al. | 370/395 |

OTHER PUBLICATIONS

International Search Report, PCT/US98/13206, 8 pages.

International Search Report, PCT/US98/13362, 5 pages.

International Search Report, PCT/US98/13203, 7 pages.

International Search Report, PCT/US98/13202, 4 pages.

International Search Report, PCT/US98/13361, 5 pages.

International Search Report, PCT/US98/13200, 6 pages.

Wang et al., A Novel Message Switch for Highly Parallel Systems, IEEE, p. 150–155, 1989.

Tobagi, Fast Packet SwitchArchitectures for Broadband Integarted Services Digital Networks, Proceedings of the IEEE, vol. 78, Issue 1, pp. 133–167, Jan. 1990.

Fliesser et al., Design of a Multicast ATM Packet Switch, Electrical and Computer Engineering, 1993 Canadian Conference, pp. 779–783, 1993.

Chang et al., An Overview of the Pipelined Common Buffer Architecture (PCBA) for Memory Based Packet/Cell Switching Systems, Local Computer Networks, 1994, pp. 288–297, 19th Conference, IEEE.

Agrawal et al., A Scalable Shared Buffer ATM Switch Architecture, VLSI, 1995 5th Great Lakes Symposium, IEEE, pp. 256–261, 1994.

Sabaa et al., Implementation of a Window–Based Scheduler in an ATM Switch, Electrical and Computer Engineering, 1995 Canadian Conference, IEEE, pp. 32–35, 1995.

Naraghi–Pour et al., A Multiple Shared Memory Switch, System Theory, 1996 Southeastern Symposium, IEEE, pp. 50–541996.

Iyengar et al., Switching Prioritized Packets, Globecom '89: IEEE Global Telecommunications Conference, pp. 1181–1186, 1989.

International Search Report, PCT/US98/13368, 5 pages.

International Search Report, PCT/US98/13364, 4 pages.

International Search Report, PCT/US98/13365, 4 pages.

International Search Report, PCT/US98,13177, 4 pages.

International Search Report, PCT/US98/13199, 5 pages.

International Search Report, PCT/US98/13015, 5 pages.

"Foundry Products", downloaded from Website http://www.foundrynet.com/ on Jun. 19, 1997.

Anthony J. McAuley & Paul Francis, "Fast Routing T able Lookup Using CAMs", IEEE, 1993, pp. 1382–1390.

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from Website http://www.baynetworks.com on Apr. 18, 1997.

SYSTEM AND METHOD FOR A QUALITY OF SERVICE IN A MULTI-LAYER NETWORK ELEMENT

FIELD OF THE INVENTION

The present invention relates in general to packet forwarding within a network and, in particular, to a system and method for forwarding packets using multi-layer information.

BACKGROUND OF THE INVENTION

Communication between computers has become an important aspect of everyday life in both private and business environments. Networks provide a medium for this communication and further for communication between various types of elements connected to the network such as servers, personal computers, workstations, memory storage systems, or any other component capable of receiving or transmitting data to or from the network. The elements communicate with each other using defined protocols that define the orderly transmission and receipt of information. In general, the elements view the network as a cloud to which they are attached and for the most part do not need to know the details of the network architecture such as how the network operates or how it is implemented. Ideally, any network architecture should support a wide range of applications and allow a wide range of underlying technologies. The network architecture should also work well for very large networks, be efficient for small networks, and adapt to changing network conditions.

Networks can be generally be differentiated based on their size. At the lower end, a local area network (LAN) describes a network having characteristics including multiple systems attached to a shared medium, high total bandwidth, low delay, low error rates, broadcast capability, limited geography, and a limited number of stations, and are generally not subject to post, telegraph, and telephone regulation. At the upper end, an enterprise network describes connections of wide area networks and LANs connecting diverse business units within a geographically diverse business organization.

To facilitate coimmunication within larger networks, the networks are typically partitioned into subnetworks, each sharing some common characteristic such as geographical location or functional purpose, for example. The partitioning serves two main purposes: to break the whole network down into manageable parts and to logically (or physically) group users of the network. Network addressing schemes may take such partitioning into account and thus an address may contain information about how the network is partitioned and where the address fits into the network hierarchy.

For descriptive and implementive purposes, a network may be described as having multiple layers with end devices attached to it, communicating with each other using peer-to-peer protocols. The well-known Open Systems Interconnection (OSI) Reference Model provides a generalized way to view a network using seven layers and is a convenient reference for mapping the functionality of other models and actual implementations. The distinctions between the layers in any given model is clear, but the implementation of any given model or mapping of layers between different models is not. For example, the standard promulgated by the Institute of Electrical and Electronics Engineers (IEEE) in its 802 protocols defines standards for LANs and its definitions overlap the bottom two layers of the OSI model.

In any such model, a given layer communicates either with the same layer of a peer end station across the network, or with the same layer of a network element within the network itself. A layer implements a set of functions that are usually logically related and enable the operation of the layer above it.

The relevant layers for describing this invention include OSI Layers 1 through 4. Layer 1, the physical layer, provides functions to send and receive unstructured bit patterns over a physical link. The physical layer concerns itself with such issues as the size and shape of connectors, conversion of bits to electrical signals, and bit-level synchronization. More than one type of physical layer may exist within a network. Two common types of Layer 1 are found within IEEE Standard 802.3 and FDDI (Fiber Distributed Data Interface).

Layer 2, the data link layer, provides support for framing, error detecting, accessing the transport media, and addressing between end stations interconnected at or below layer 2. The data link layer is typically designed to carry packets of information across a single hop, i.e., from one end station to another within the same subnet, or LAN.

Layer 3, the network layer, provides support for such functions as end to end addressing, network topological information, routing, and packet fragmentation. This layer may be configured to send packets along the best "route" from its source to its final destination. An additional feature of this layer is the capability to relay information about network congestion to the source or destination if conditions warrant.

Layer 4, the transport layer, provides application programs such as an electronic mail program with a "port address" which the application can use to interface with the data link layer. A key difference between the transport layer and the lower layers is that an application on a source end station can carry out a conversation with a similar application on a destination end station anywhere in the network; whereas the lower layers carry on conversations with end stations which are its inunediate neighbors in the network. Layer 4 protocols also support reliable connection oriented services, an example Layer 4 protocol providing such services is the Transport Control Protocol (TCP).

Different building blocks exist for implementing networks that operate at these layers. End stations are the end points of a network and can function as sources, destinations and network elements or any other intermediate point for forwarding data received from a source to a destination.

At the simplest level are repeaters which are physical layer relays which simply forward bits at Layer 1.

Bridges represent the next level above repeaters and are data link layer entities which forward packets within a single LAN using look-up tables. They do not modify packets, but just forward packets based on a destination. Most bridges are learning bridges. In these bridges, if the bridge has previously learned a source, it already knows to which port to forward the packet. If the bridge has not yet forwarded a packet from the destination, the bridge does not know the port location of the destination, and forwards the packet to all unblocked output ports, excluding the port of arrival. Other than acquiring a knowledge of which ports sources are transmitting packets to, the bridge has no knowledge of the network topology. Many LANs can be implemented using bridges only.

Routers are network layer entities which can forward packets between LANs. They have the potential to use the best path that exists between sources and destinations based on information exchanged with other routers that allow the routers to have knowledge of the topology of the network. Factors contributing to the "best" path might include cost, speed, traffic, and bandwidth, as well as others.

Brouters are routers which can also perform as bridges. For those layer 3 protocols of which the brouter knows, it uses its software to determine how to forward the packet. For all other packets, the brouter acts as a bridge.

Switches are generalized network elements for forwarding packets wherein the composition of the switch and whether it implements layer 2 or layer 3 is not relevant.

Typically, bridges forward packets in a flat network without any cooperation by the end stations, because the LAN contains no topological hierarchy. If a LAN, for example, is designed to support layer 3 functionality, then routers are used to interconnect and forward packets within the LAN.

Bridges cannot use hierarchical routing addresses because they base their forwarding decisions on media access control (MAC) addresses which contain no topological significance. Typically MAC addresses are assigned to a device at its time of manufacture. The number of stations that can be interconnected through bridges is limited because traffic isolation, bandwidth, fault detecting, and management aspects become too difficult or burdensome as the number of end stations increases.

Learning bridges self-configure, allowing them to be "plug and play" entities requiring virtually no human interaction for setup. Routers, however, require intensive configuration, and may even require configuration activities at the end nodes. For example, when a network utilizes the Transmission Control Protocol/Internet Protocol (TCP/IP), each end node must manually receive its address and subnet mask from an operator, and such information must be input to the router.

Generally, as the size and complexity of a network increases, the network requires more functionality at the higher layers. For example, a relatively small LAN can be implemented by using Layer I elements such as repeaters or bridges, while a very large network uses up to and including Layer 3 elements such as routers.

A single LAN is typically insufficient to meet the requirements of an organization because of the inherent limitations: (1) on the number of end stations that can be attached to a physical layer segment; (2) the physical layer segment size; and (3) the amount of traffic, which is limited because the bandwidth of the segment must be shared among all the connected end stations. In order to overcome these constraints, other network building blocks are required.

As briefly described above, when the number of end stations in a network increases, the network may be partitioned into subnetworks. A typical address in a partitioned network includes two parts: a first part indicating the subnetwork; and a second part indicating an address within the subnetwork. These types of addresses convey topological information because the first part of the address defines geographical or logical portions of the network and the second part defines an end station within the subnetwork portion. Routing with hierarchial addressing involves two steps: first packets are routed to the destination's subnetwork; and second packets are forwarded to the destination within the subnetwork.

An end station receives a unique data link address—the MAC address—at the time of manufacture, allowing the end station to attach to any LAN within a bridged network without worrying about duplicate addresses. Data link addresses therefore cannot convey any topological information. Bridges, unlike routers, forward packets based on data link addresses and thus cannot interpret hierarchical addresses.

The current Internet is being forced to deal with increasing numbers of users and increasing demands of multimedia applications. Future networks will be required to support even higher bandwidth, larger numbers of users, and traffic classification requirements by the network. Statistical studies show that the network domain as well as the number of workstations connected to the network will grow at a faster rate in future. The trend is also to support multiple traffic types with varied characteristics on a same physical link. This calls for more network bandwidth and efficient usage of resources. To meet the bandwidth requirement, the speed on the networks is on the upward trend, reaching to gigabit speeds.

Network designers frequently use one particular combination of ISO Layer 2 and Layer 3 because of the success of the Internet and the increasing number of products and networks using the Internet. Specifically, in a typical Internet-associated network, designers combine an implementation in accordance with the IEEE 802 Standard (which overlaps ISO Layer 1 and Layer 2) with the Internet Protocol (IP) network layer. This combination is also becoming popular within enterprise networks such as intranets.

Supporting this combination by building networks out of layer 2 network elements provides fast packet forwarding but has little flexibility in terms of traffic isolation, redundant topologies, and end-to-end policies for queuing and administration (access control). Building such networks out of layer 3 elements alone sacrifices performance and is impractical from the hierarchical point of view because of the overhead associated with having to parse the layer 3 header and modify the packet if necessary. Furthermore, using solely layer 3 elements forces an addressing model with one end station per subnet, and no layer 2 connectivity between the end stations.

Networks built out of a combination of layer 2 and layer 3 devices are used today, but suffer from performance and flexibility shortcomings. Specifically, with increasing variation in traffic distribution (the role of the "server" has multiplied with browser-based applications), the need to traverse routers at high speed is crucial.

The choice between bridges and routers typically results in significant tradeoffs (in functionality when using bridges, and in speed when using routers). Furthermore, the service characteristics, such as priority, within a network are generally no longer homogeneous, despite whether traffic patterns involve routers. In these networks, differing traffic types exists and require different service characteristics such as bandwidth, delay, and etc.

To meet the traffic requirements of applications, the bridging devices should operate at line speeds, i.e., they operate at or faster than the speed at which packets arrive at the device, but they also must be able to forward packets across domains/subnetworks. Even through current hybrid bridge/router designs arc able to achieve correct network delivery functions, they are not able to meet today's increasing speed requirements.

What is needed is a switch or network element that forwards both layer 2 and layer 3 packets quickly and efficiently both within a subnetwork and to other networks. Further, a network element is needed that can forward layer 3 packets at wire-speed, i.e., as fast as packets enter the network element. Additionally, a network element is needed that allows layer 2 forwarding within a subnetwork to have the additional features available in layer 3 routing and to provide certain quality of service for applications within the subnetwork, such as priority and bandwidth reservation.

SUMMARY OF THE INVENTION

The present invention enables the above problems to be substantially overcome by providing a system and method for an multi-layer network element for forwarding received packets to one or more appropriate output ports.

The apparatus according to one embodiment that detects and handles congestion in an output port of a multi-layer network element comprises a central processor unit (CPU) and a switching element. The switching element is configured to output packets to a network through output ports. The switching element includes at least one variable-length output queue that queues packets for output, having storage locations for packet pointers. Each queue has associated with it a start register that stores a pointer to the storage location at the front of the queue and an end register that stores a pointer to the storage location at the end of the queue as determined by the number of storage location. The queues also have associated with each of them a next-free register that stores a pointer to the next available storage location, wherein packet pointers are stored in the output queue beginning at the location pointed to by the start register and the next-free register is incremented as the next available storage location moves toward the second pointer. The output queues also have associated with each, a programmable threshold register that stores a threshold pointer to a storage location between the location represented by the start register and the location represented by the end register.

Threshold logic outputs a congestion signal when the value in the next free register represents a storage location logically located between the location pointed to key the threshold register and including the storage location pointed to by the end register.

In response to the congestion signal, random discarding logic randomly selects packets to discard, so that once the threshold is exceeded, incoming packets are randomly discarded, using a packet discarding algorithm, such as Random Early Discard (RED). Capacity logic outputs a queue full signal to the CPU when queue becomes full.

The switching element also includes a memory having at least one entry that stores information about forwarding decisions for the packet, wherein the entry is adapted to indicate whether packets associated with that entry should be counted. Memory access logic accesses the entry when an incoming packet associated with that entry arrives at the switching element. A packet counter counts the number of times the entry is accessed, to represent an entry bandwidth and a computer program mechanism coupled to the CPU compares the contents of the packet counter to a reservation-based protocol negotiated value and lowers a priority of any future packet associated with the entry and destined for the output queue.

According to another embodiment of the invention an apparatus for handling multiple priorities for a multicast packet being output from a network element on at least two output ports includes at least two output queues having different priorities and a memory configured to output forwarding information about the multicast packet in response to a memory access based in part on a multicast address of the multicast packet, the forwarding information including priority information indicating to which output queue at each output port the multicast packet will be directed.

A central processing unit coupled to the memory utilizes a computer program mechanism coupled to the central processing unit to modify the priority information based on an amount of packets being transmitted through one of the output ports.

A central processing unit coupled to the memory may also utilize a computer program mechanism coupled to the central processing unit configured to modify the priority information based on information communicated between the network element and an intended recipient of the multicast packet.

According to still another embodiment of the invention an apparatus for queue scheduling in a network element includes at least one output port configured to output packets, each packet having a byte length. At least two queues associated with each output port, configured to queue packets to be output at each output port are also provided.

A weight register is associated with each queue and contains a weight number generated based on weighting criteria. Transmitting logic at each output port transmits packets identified in each queue according to a queue select signal and responsive to a done signal. Scheduling logic at each output port selects one of the queues and generates the queue select signal to the transmitting logic to indicate which queue will be transmitting. Counter logic, at each output port, decrement the weight register equal to a number of bytes transmitted by the transmitting logic and zero logic configured to transmit the done signal when the number in the counter represents zero. Reloading logic determines the number of packets transmitted after the done signal and places in the weight register a value equal to the weight number minus the number of packets transmitted after the done signal.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing the spirit and scope of the present invention. Accordingly, the drawings and detailed description are to be regarded as illustrative in nature and not as restrictive.

DETAILED DESCRIPTION

Figure 1:
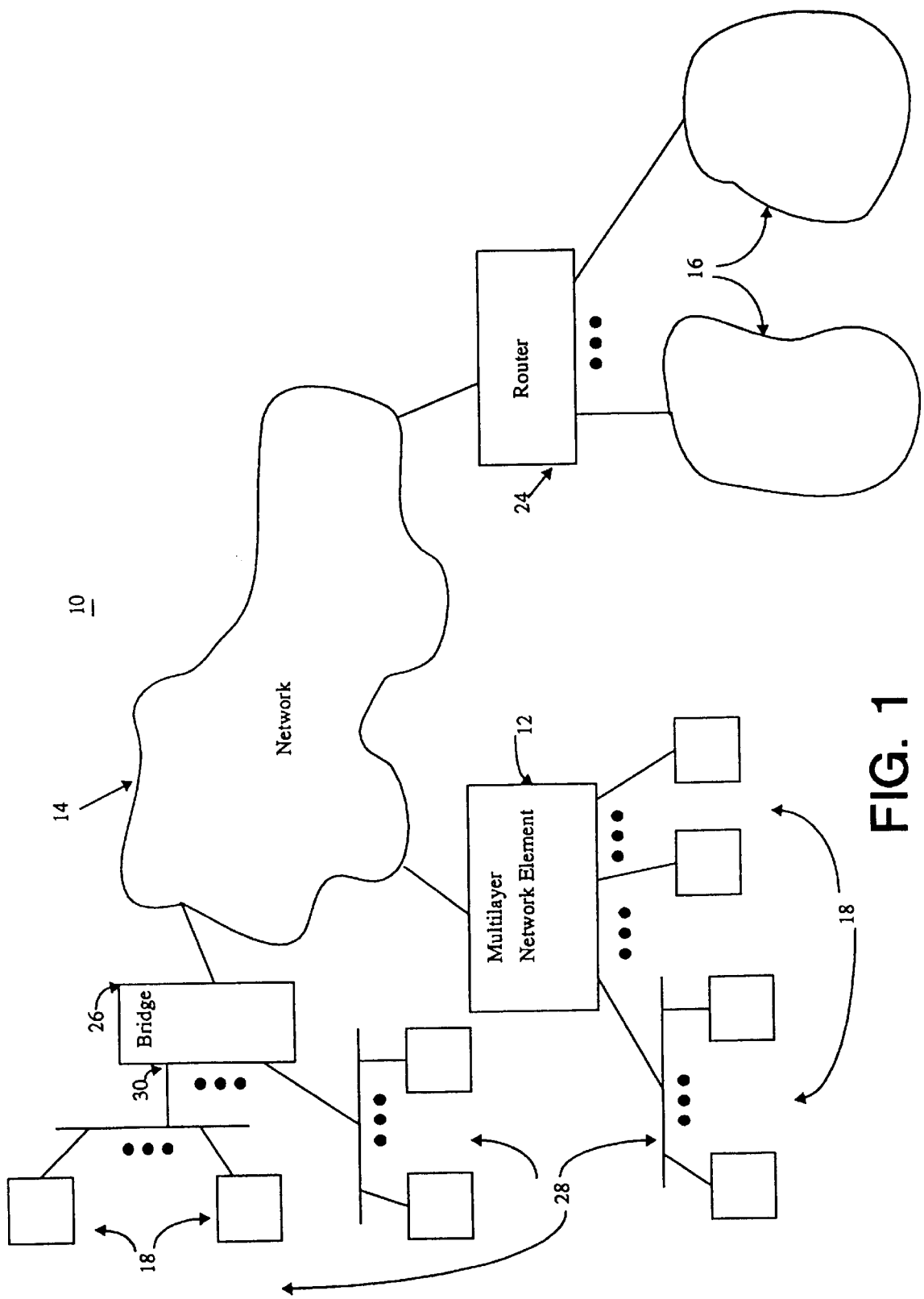
FIG. 1 illustrates a system incorporating a multi-layer network element according to the invention.

FIG. 1 illustrates a system incorporating a multi-layer network element according to the present invention. The system includes the multi-layer network element, various networks, end stations, routers, and bridges. By way of example and as broadly embodied and described herein, a system 10 incorporating a multi-layer network element 12 according to the present invention includes networks 14 and 16, end stations 18, router 24, bridge 26, and local area networks (LAN) 28.

The bridge 26 connects some of the LANs 28 and end stations 18 to the network 14 and to each other. The bridge 26 may be a conventional learning bridge. The bridge 26 keeps track of the addresses of the end stations 18 that transmit a packet showing up on one of ports 30 to the bridge 26. The end stations 18 may be any device capable of sending or receiving packets of information. Typically, the end stations 18 are personal computers, workstations, printers, servers, and/or any other device that can be connected to a network.

The bridge 26 initially does not know on which of its ports packet destinations are located, and must flood an incoming packet to all ports in order to properly forward the packet. Once the bridge 26 receives a packet destined for an address it already recognizes, the bridge 26 knows what port the destination is on so that it does not have to flood the packet on all outgoing ports. Eventually, the bridge 26 has learned enough addresses to all but eliminate the amount of flooding needed on the ports. Of course, any time an end station 18 changes ports on the bridge 26, the bridge 26 must relearn the end station 18's port.

The bridge 26 typically does not modify the packet, contains no information about the topology of the network 14, and examines few parts of the packet header. The bridge 26 operates quickly because it makes no modifications to the packet and is only concerned with learning sources and forwarding to destinations. Typically, bridges 26 use look-up tables to search for sources and destinations.

The router 24 connects the network 14 to the networks 16. Only one router 24 is illustrated by way of example, but there may be many routers connecting other networks or end stations 18. The router 24 provides the communication necessary between the network 14 and the networks 16 and may a conventional router. Such routers include layer 3 functionality for forwarding packets to an appropriate destination including route calculation, packet fragmentation, and congestion control. Routers of this type are described, for example, in *Interconnections*: Bridges and Routers by Radia Perlman published by Addison-Wesley. The router 24 must have knowledge of the topology of the network in order to determine the best route for packets. The router 24's knowledge of the network is gained through topological infonnation passed between multiple such routers 24 connected to the network 14.

Software running on the router 24 parses an incoming packet to determine various characteristics about the packet, including the type of the protocol being used and the source and destination(s). Other determinations based on examining the packet may be necessary, such as priority and quality of service (QoS) factors such as priority and bandwidth reservation. The router 24 then uses the extracted information and computes the next destination for the packet based on topology and route information that is stored in the memory of the router 24. The router 24 also applies QoS rules and actions.

The router 24's process for calculating the next destination may require many accesses to memory and computation of the route from that infonnation. Furthermore, the packet is typically received and stored while any processing is taking place. After the router 24 has determined what actions are necessary on the packet, any modifications are made to the packet as stored in the memory or on the way out of the router 24. The routers 24 are typically required to replace the layer 2 source and destination of the packet for unicast packets, update any checksums of the packet, and handle any issues related to packet lifetime.

To carry out the functions that the conventional router 24 performs, the software examines memory locations, make modifications to the packet, and calculate new values for some fields. Such actions provide increased functionality beyond simple packet forwarding like that found in bridges 26 such as determining the best route for the packet, providing QoS features; however, in conventional routers 24 such actions take up valuable time.

The network 14 provides communication paths for all of the elements connected to it. In the example of FIG. 1, the elements include the multi-layer network element 12, router 24, and bridge 26. Any number of elements could be connected to the network 14 in a multitude of ways. FIG. 1 illustrates only one possible combination. The elements connected to the network 14 do not require the network 14 to be of any particular size or configuration. For the end stations 18 and the bridge 26, a detailed topological knowledge of the network 14 is not required.

The multi-layer network element 12 according to the present invention connects various elements to the network 14 and to each other. As illustrated by way of example, the multi-layer network element 12 connects a LAN 28, the end stations 18, and the network 14. The multi-layer network element 12 combines the functions of both a bridge and a router. Functioning as a router, the multi-layer network element 12 contains topological information about network 14 to intelligently route a packet to its destination while providing associated layer 3 functionality typically found in a router 24. Functioning as a bridge, the multi-layer network element 12 learns source/port combinations to forward layer 2 packets. The multi-layer network element 12 differs from conventional bridge/router combinations in that certain layer 3 processing operates as quickly as layer 2 switching found in the bridge 26.

Figure 2:
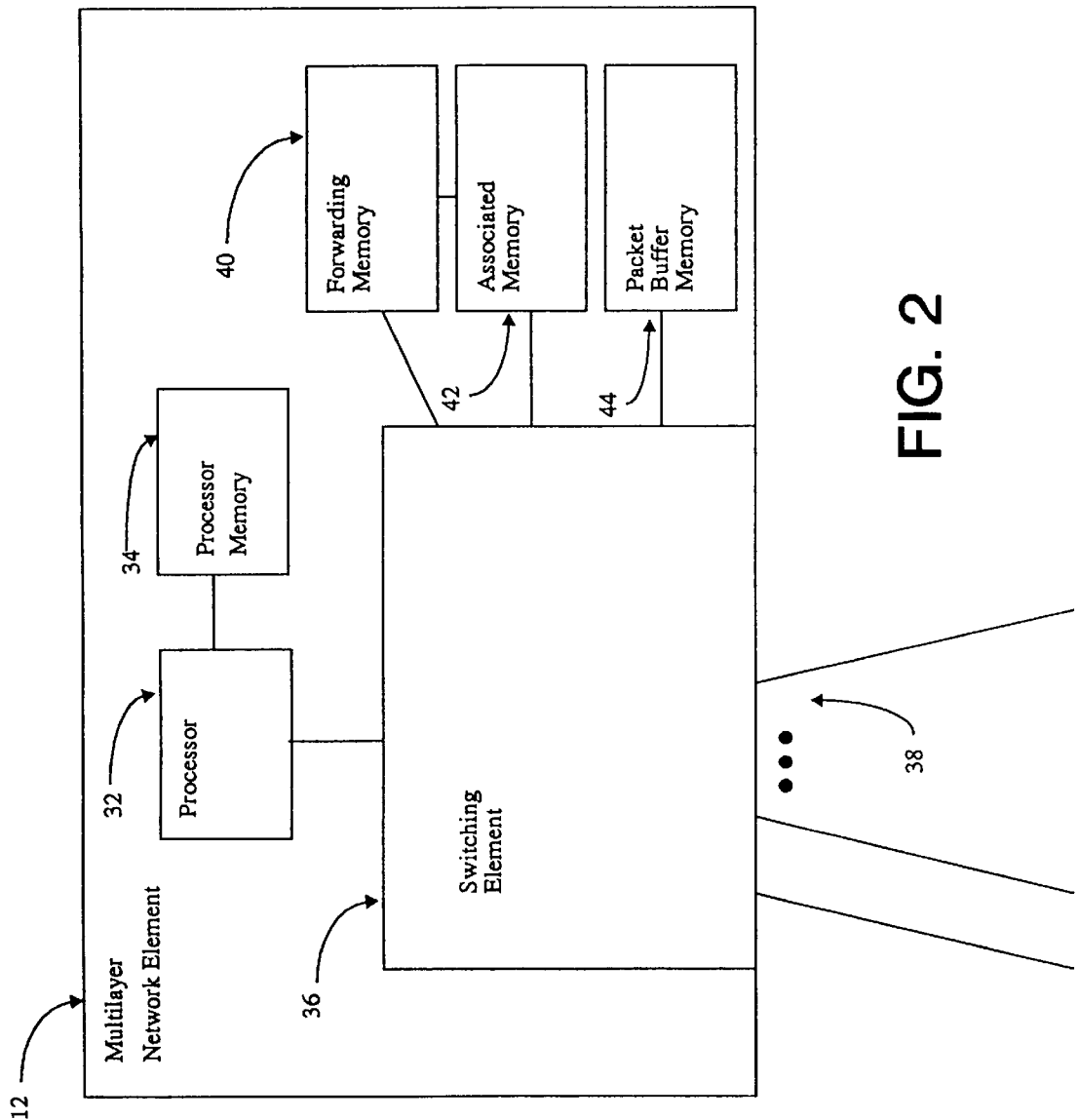
FIG. 2 illustrates the multi-layer networking element of FIG. 1.

FIG. 2 illustrates the multi-layer network element 12 of FIG. 1 in more detail. The multi-layer network element 12 according to one embodiment of the invention includes a processor 32, a processor memory 34, a switching element 36, a plurality of network clement ports 38, a forwarding memory 40, an associated memory 42, and packet buffer memory 44. The end stations 18, the LAN 28, and the network 14 are connected to the multi-layer network element 12 using a plurality of network element ports 38. Other multi-layer network elements 12 may also be connected to the multi-layer network element 12.

The switching element 36 is also connected to the processor 32, the forwarding memory 40, the associated memory 42, and the packet buffer memory 44. The processor 32 is also connected to the memory 34. Forwarding memory 40 and associated memory 42 is connected to each other as well to as switching element 36.

The switching element 36 performs most of the packet forwarding functions using both layer 2 and layer 3 information, and possibly also some layer 4 information, stored in forwarding memory 40 and associated memory 42, without having to rely on the processor 32 to calculate routes or determine appropriate actions on every packet.

The processor 32 performs tasks that the switching element 36 is not equipped to handle. For example, when new layer 3 routes must be calculated, the processor 32 uses processor memory 34, which contains detailed information about the topology of any networks reachable from the multi-layer network element 12. The processor 32 makes its computations primarily using software programming units in conjunction with accesses to the memory 34. The switching element 36 makes its decisions primarily in hardware, using the forwarding memory 40 and the associated memory 42. The forwarding memory 40 and the associated memory 42 contain only a portion of the information contained in the memory 34, and are configured for quick access and retrieval.

Figure 3:
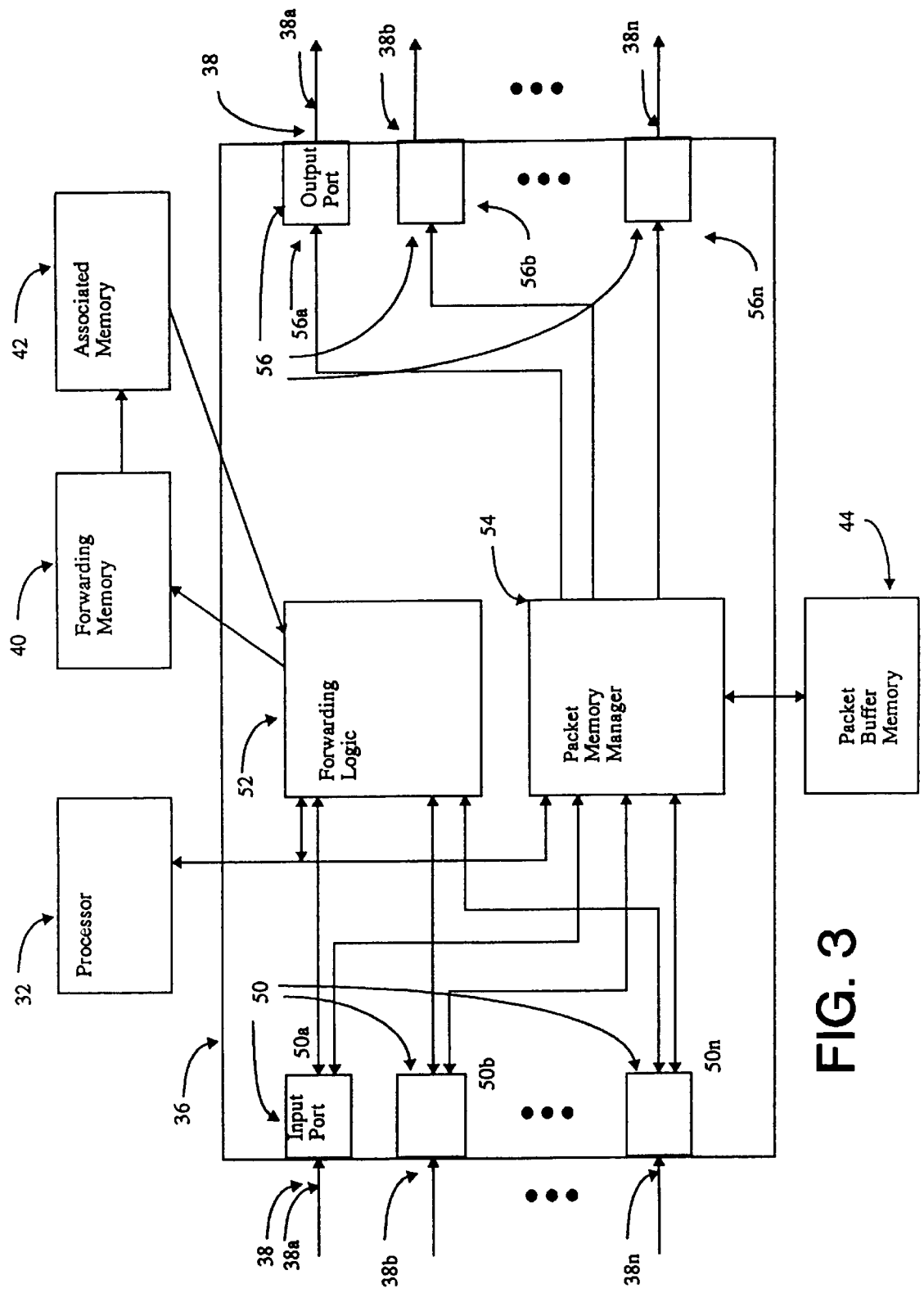
FIG. 3 illustrates the switching element of the multi-layer network element in more detail.

FIG. 3 illustrates a detailed view of the switching element 36 and its connections to the processor 32, the plurality of network element ports 38*a–n*, the forwarding memory 40, the associated memory 42, and the packet buffer memory 44. The switch element 36 includes input ports 50*a–n*, a forwarding logic 52, a packet memory manager 54, and output ports 56*a–n*. Each input port 50*i* and output port i corresponds to a network element port 38*i*. Each of the inputs ports 50 also connects to both the forwarding logic 52 and the packet memory manager 54.

For a given i, an input port 50*i* receives packets from its respective multi-layer network element port 38*i* and tests the packets for correctness. If the packet is ill formed, it is discarded. Packets passing this initial screening are temporarily buffered by the input port 50*i*. Once the input port 50*i* has buffered at least the first 64 bytes of the received packet, the input port 50*i* passes the header to the forwarding logic 52.

The forwarding logic 52 is connected to the processor 32, the forwarding memory 40, and the associated memory 42. The forwarding logic 52 performs several functions. It initially screens the packet to determine whether the packet is encapsulated, by for example Subnetwork Access Protocol (SNAP), or whether the packet is tagged, for example, by a virtual LAN (VLAN) identifier. If the packet is either of those two types, the forwarding logic 52 uses offset information to locate appropriate layer header information needed for further processing.

The forwarding logic 52 also searches the forwarding memory 40 for matches at layer 2 and/or layer 3. The search may also include some information at layer 4. In the preferred embodiment, the forwarding memory 40 is a content-addressable memory (CAM) storing information about both layer 2 and layer 3 switching, and may contain some layer 4 information. If a match is found, data stored in associated memory 42 and pointed to by the matching entry in the forwarding memory 40 serves to define the actions that the switching element 36 must do to forward the packet to the appropriate destination(s).

In another embodiment, the forwarding memory 40 could be implemented using an sequentially address random access memory. In this embodiment, a hashing function would be preformed on the particular key. The resulting hashed value would be an address into the memory 42 associated with the pre-hashed key.

In still another embodiment, the forwarding memory 40 and the associated memory 42 could be contained in a single random access memory. In one implementation of that single random access memory, the entries could be accessed sequentially, requiring a hash-front end. Another implementation of that single random access memory could be a CAM.

The packet memory manager 54 is connected to the packet buffer memory 44, the input port 50*i*, and the output port 56*i*. As indicated above, each output port 56*i* corresponds to one of the plurality of multi-layer network element ports 38*i*. While illustrated as separate units, the input port 50*i* and output port 56*i* corresponding to a particular multi-layer network element port 38*i* are tightly coupled since information flows both ways through the network element ports 38.

After the forwarding logic 52 has determined what to do with the packet, it passes that information to the input port 50*i*. If the input port 50*i* does not filter the packet, then it requests pointer to free memory locations in the packet buffer memory 44 from the packet memory manager 54. The packet memory manager 54 responds by providing location addresses of free memory space in the packet buffer memory 44. The input port 50*i* then requests a write access from the packet memory manager 54 and sends the pointer and the data to the packet memory manager 54.

In some instances, the input port 50*i* must make modifications to the packet as instructed to do so from the forwarding logic 52. The input port 50*i* makes these modifications prior to the packet being stored in the packet buffer memory 44. When requested by the input port 50*i*, the packet memory manager 54 places the packet into the appropriate address location specified by the input port 50*i*. The input port 50*i* then passes information about where the packet is stored to the appropriate output ports 56 as determined from the information received at the input port 50*i* from the forwarding logic 52. In a preferred embodiment, the appropriate output ports may include no output ports or one or more output ports. The output port 56*i* requests and receives packets from the packet manager 54, and transmits the packet to its associated network element port 38*i* when the conditions for transmission are met. In some instances, the output port 56*i* must place its MAC address as the source address on outgoing packets. If this situation is dictated by the results from the forwarding logic 52 as passed to the input port 50*i*, the input port 50*i* places such an indication in the packet buffer memory 44. The output port 56*i* detects this indication and replaces the address as the packet leaves the output port 56*i*. Thus, only minor modifications to the packets are necessary on the output side of the switching element 36.

According to the above embodiment, when the forwarding memory 40 contains matching entries for layer 2 switching or layer 3 routing, the multi-layer network element 12 will operate at wire-speed. Wire-speed is defined by the speed at the maximum packet rate at which a given layer 1 and layer 2 combination can transport packets. If an element connected to a network can process packets as fast as they enter the element or faster, then the element operates at wire speed.

In a preferred embodiment, the network element 12 processes packets for a worst-case scenario of a steady stream of 64-byte packets entering all input ports 50 simultaneously. If the layer 3 information is not contained in the forwarding memory 40, the packet is forwarded using layer 2 information and then processed according to conventional layer 3 processing by software in the processor 32.

Unlike conventional layer 3 processing, the processor 32 may update the forwarding memory 40 by placing new layer 3 entries as they are learned and created. Any packets matching the new entries are forwarded at wire-speed, i.e. forwarding decisions are made for a packet before the next packet arrives.

While the discussion of this invention is described using layer 2 and a combination of layers 3 and 4, one skilled in the art would recognize that searching on and creating entries in the forwarding memory 40 for any portion of a packet or its header, or any combination thereof, readily flows from the description. Thus, this invention is not limited to any specific implementation of layers according to the ISO standard.

Figure 4:
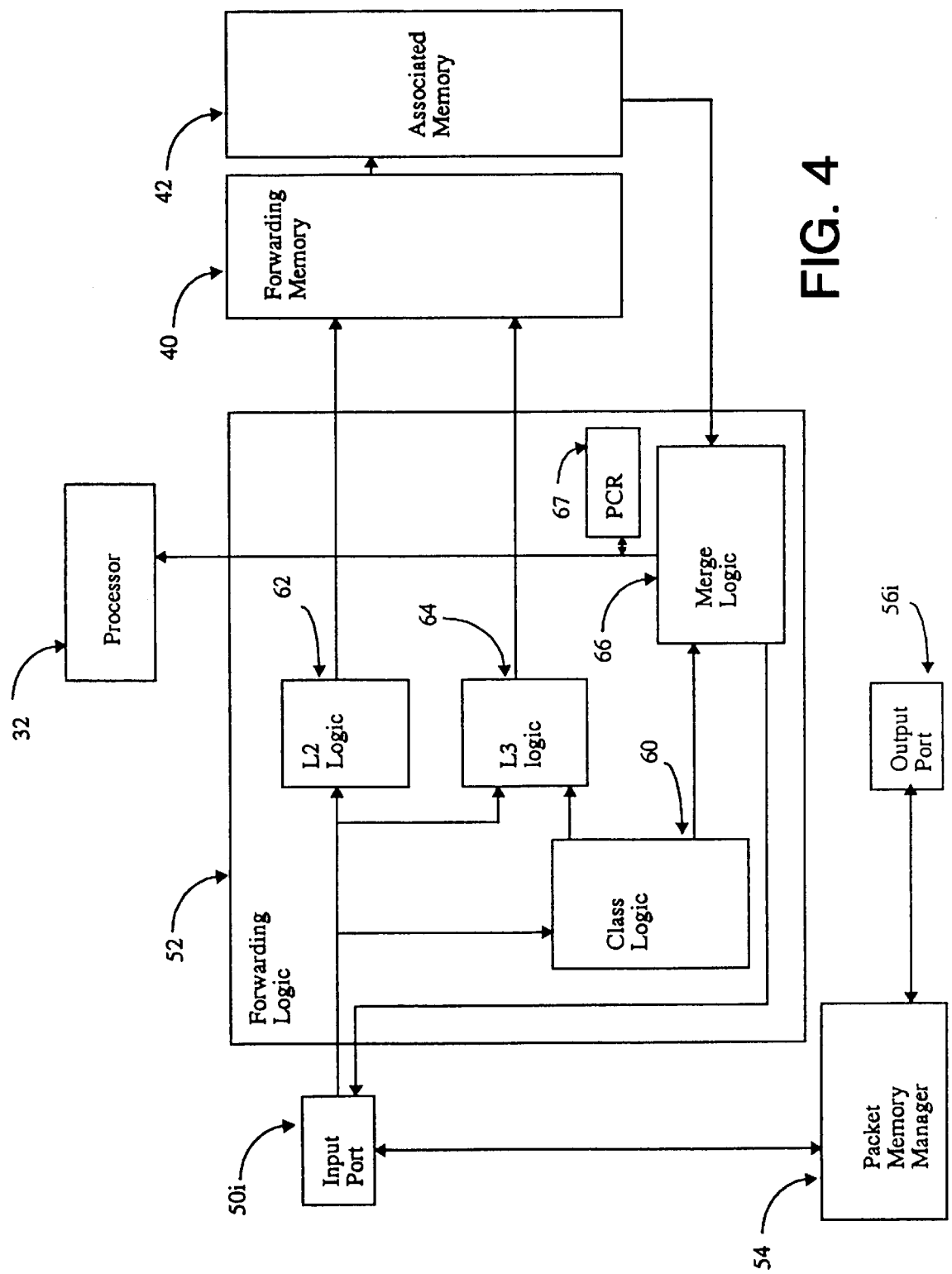
FIG. 4 illustrates the forwarding logic of the switching element in more detail.

FIG. 4 illustrates the forwarding logic 52 in more detail. The forwarding logic 52 includes class logic 60, layer 2 (L2) logic 62, layer 3 (L3) logic 64, and merge logic 66. The input port 50i connects to the class logic 60, the L2 logic 62, the L3 logic 64, and the merge logic 66. Only one input port 50i is shown for simplification, though all input ports 50 are connected in a similar manner. Preferably, the forwarding logic 52 is not duplicated for each input port 50i. Instead, all input ports 50 arbitrate for access to the forwarding logic 52.

The L2 logic 62 is connected to the forwarding memory 40 and is responsible for creating a key to match against the entries stored in the forwarding memory 40 for layer 2 forwarding decisions. Depending on the configuration of the forwarding memory 40, the key may be applied against all or some of the entries of the forwarding memory 40

During operation, the input port 50i receives a packet from the multi-layer network element port 38i and sends the header plus the input port 50i identifier to the forwarding logic 52. The forwarding logic 52 first searches the forwarding memory 40 to determine whether the forwarding memory 40 contains an entry for the layer 2 source transmitting the packet. A matching entry will exist if the multi-layer network element 12 has previously received a packet from the same layer 2 source and has learned which port it is connected to. If no matching entry exists, the forwarding logic 52 performs a learn function by placing an entry in the forwarding memory 40 including the source address. The forwarding logic 52 signals the processor 32 that it has learned a new source address. In some instances, the layer 2 source will exist in the forwarding memory 40, but will be associated with a different input port 50i than the input port 50i of the incoming packet. In this instance, no matching entry will exist in the forwarding memory 40 because a match depends on both the layer 2 source and the input port 50i.

The forwarding logic 52 also searches the forwarding memory 40 for an entry indicating the port of the destination address. If no match is found, then the forwarding logic 52 instructs the input port 50i to flood the packet to all of the active output ports 56.

For the layer 2 infonnation described above in the preferred embodiment, the forwarding memory 40 contains the values of the MAC addresses of the sources and a pointer to a corresponding entry in the associated memory 42. The forwarding memory 40 may also contain additional layer 2 information such as a VLAN identifier if tagged packets are being used. The associated memory 42 contains more information about its corresponding entry in the forwarding memory 40. Layer 2 information in the forwarding memory 40 is preferably limited to the least amount of infonnation necessary to make a layer 2 search. In a layer 2 search, this information is preferably just the MAC address and the input port 50i, but the CAM may also contain any information relating to tagged addressing.

In a preferred embodiment, the forwarding memory 40 allows multiple matches for a layer 2 search. The processor 32 ensures that the order of the entries is such that if an address/port combination exists in the forwarding memory, that entry is selected. If the particular source/port combination is not found, then a match may occur including VLAN information so that any layer 2 destination search will at least match a known VLAN or an unknown VLAN entry, each of which define the output ports 56 for flooding in its respective entry.

The L3 logic 64 is connected to the forwarding memory 40 and is responsible for creating a key to match against the entries stored in the forwarding memory 40 for layer 3 forwarding decisions. As with the L2 search key, the L3 key may be applied against all or some of the entries of the forwarding memory 40.

To create the key, the L3 logic 64 uses information from the input port 50i including the packet header and an input port 50i identifier, and information from the class logic 60. The merge logic 66 is connected to the class logic 60, the associated memory 42, the packet memory manager 54, and the processor 32. The merge logic 66 uses information from the class logic 60 and information output from the associated memory 42 to instruct the input port 50i what to do to properly forward the packet to its appropriate destination(s). In some instances, there is no appropriate destination and the packet is discarded. In other instances, the merge logic 66 will signal the processor 32 that it must perform some task in response to the received packet.

Layer 3 switching, while more complex, is similar to layer 2 switching. The forwarding logic 52 searches the forwarding memory 40 for a matching entry to a layer 3 search key created by the L3 logic 64. If a match exists, the information in the associated memory 42 is used by the merge logic 66 to instruct the input port 50i what to do with the packet. If the search provides no match, the switching element 36 forwards the packet as a bridge and may pass all or portions of the packet to the processor 32 for further processing. The L3 logic 64 creates the search key using information from the packet header, the input port 50i, and the class logic 60.

Figure 5:
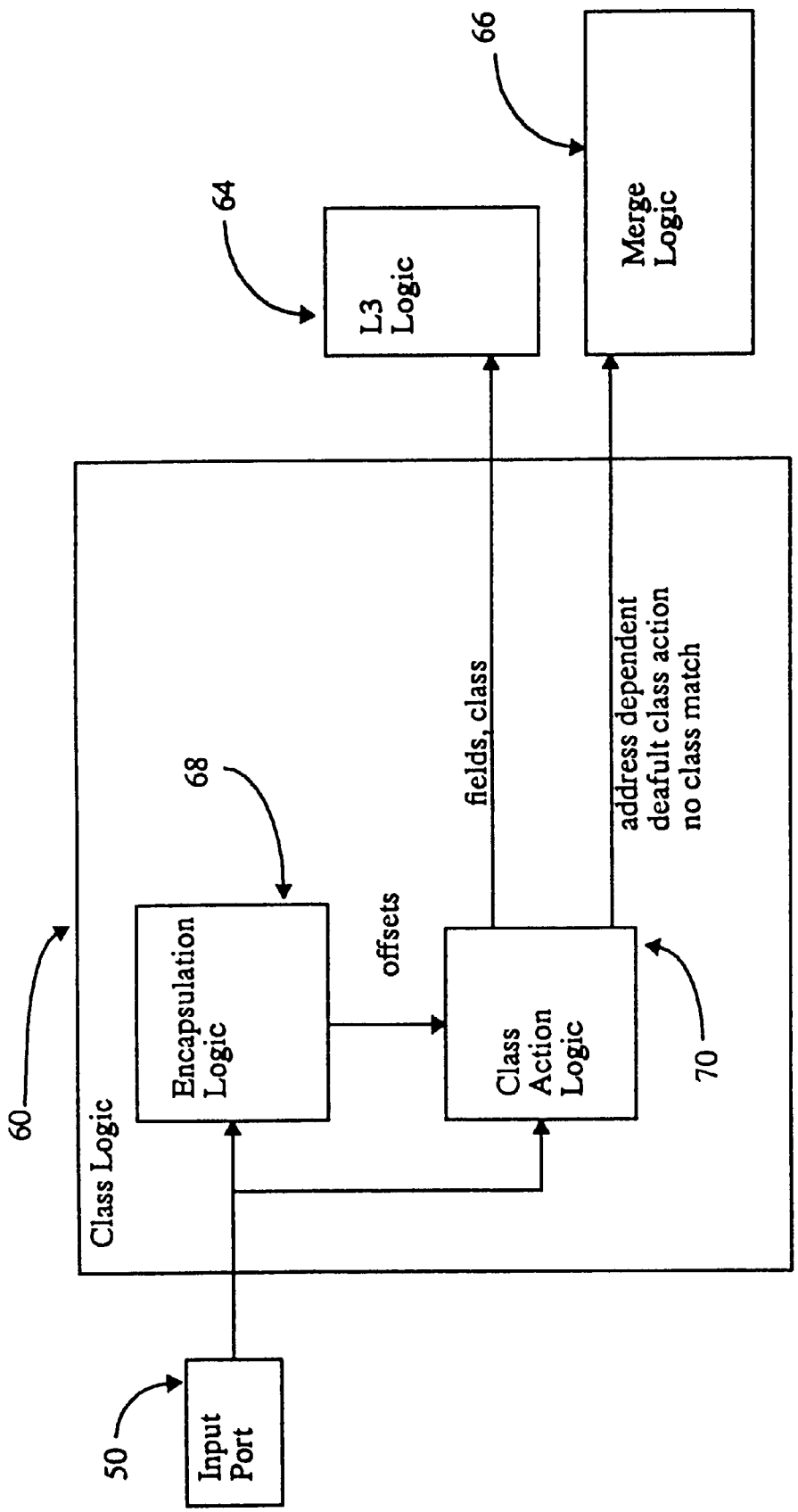
FIG. 5 illustrates the class logic of FIG. 4 in more detail.

The class logic 60 examines information in the packet header to determine any encapsulation information and to determine a class for the layer 3 information and is illustrated in more detail in FIG. 5. The class logic 60 includes the encapsulation logic 68 and the class action logic 70. Each input port 50i is connected to both the encapsulation logic 68 and the class action logic 70. The class action logic 70 is connected to the encapsulation logic 68, the L3 logic 64, and the merge logic 66.

The encapsulation logic 68 is responsible for examining the packet header and determining any offsets into the header for the layer 3 and layer 4 information, if needed. The encapsulation logic 68 includes class filters 72 to determine any offsets into the packet to identify locations of relevant information. In a preferred embodiment one filter 72 recognizes an implementation in accordance with the IEEE 802.3 Standard Ethernet header, and another filter 72 recognizes an implementation in accordance with the IEEE Standard 802.1q Tagged Ethernet Header, and still another recognizes an LCC SNAP encapsulation. Other encapsulations would become readily apparent to one skilled in the art and could be implemented with additional encapsulation filters 72. The encapsulation logic 68 passes encapsulation offsets to the class action logic 70 so that the class action logic 70 knows from where in the packet to draw the appropriate field information.

The class action logic 70 determines to which class a packet belongs. A class is used by both the L2 and L3 logics to aid in searching and to add to the functionality of the multi-layer network element 12. The L2 logic 62 applies a single class to all layer 2 searches. Layer 3, on the other hand, has a plurality of programmable classes.

The classes help to define a class type and for each class which bytes from the packet header that should be used in creating the layer 3 search key by the L3 logic 64, its priority, and a default class result that defines what should happen if no layer 3 match occurs in the forwarding memory 40.

In a preferred embodiment, there are four possible outcomes when no match occurs. First, the header may be sent to the processor 32. This is contemplated when the possibility of identifying a layer 3 flow exists. Second, the entire packet could be copied to the processor 32. This is contemplated when initially setting a unicast route or to provide firewall protection by initially examining certain routes or flows or when it is unknown where in the packet required information may exist to create search keys. Third, use layer 2 results for forwarding. Fourth, discard the packet. Other action may be possible depending on the configuration of the network or the particular protocol in use as would become readily apparent to one skilled in the art.

Some of the criteria that the classes take into account may be whether the class is considered address dependent or address-independent. Adding a class identifier allows the switching element 36 to respond to varying network situations and greatly simplifies organizing and storing information in the forwarding memory 40.

Representative examples of address independent classes that could be identified by the class logic 60 include: Address Resolution Protocol (ARP); Internet Group Management Protocol (IGMP); Reverse ARP (RARP); Group Address Registration Protocol (GARP); Protocol Independent Protocol (PIM); and Reservation Protocol (RSVP). Representative examples of address dependent classes include: TCP flow; non fragmented UDP flow; fragmented UDP flow; hardware routable IP; and IP version 6. Of course, other protocols could be similarly recognized.

The class logic 60 produces an unambiguous class result for every incoming packet. For an unrecognized protocol, the class logic 60 will still produce a class result, but that class result signifies an unrecognized protocol and what actions should take place on a packet of this type of class.

Generally, layer 3 flows are address dependent and will contain information beyond just a simple class of traffic. In those instances where additional information has been placed by the processor 32 into the forwarding memory 40, there may be more than one entry for a particular class in the forwarding memory 40. The processor 32 ensures that of the entries matched, the one used is the most appropriate one. Different classes may have different criteria for what is the most appropriate match depending on the type of packets embodied within a particular class. The flexibility allowed by having multiple matching entries in the forwarding memory 40 is further enhanced by ensuring that the best match is provided for a particular flow and because of this feature, different actions will be possible for packets within the same type of class.

In the preferred embodiment, the processor 32 reorders the layer 3 entries when it places any new layer 3 so that the best match for a particular search criteria occurs earliest in the memory. Those skilled in the art will recognize many different implementations to achieve the same result. In one preferred embodiment, the processor 32 ensures that the entry with the longest potential matching key within a particular class is at the top, or earliest, location in the memory. However, the processor 32 may also place an entry above the longest matching entry so that for a particular traffic pattern the most important match may be one that matches many keys. For example, an entry that matches, for a particular class, based on an application port such as "http" and no other information, will take precedence over entries that might match more than just the layer 4 application. Another example might be forcing a match on a particular source within a class type. This might occur when the operator might want to provide packets coming from a particular server with a high priority regardless of the destination or layer 4 application.

In a preferred embodiment, the merge logic 66 directs the input port 50i to take one of the following actions on a packet: filter the packet; forward the packet at layer 2; forward the packet as a layer 3 flow; process the packet as a layer 3 route; and forward the packet as a multicast route. Packets that the merge logic 66 instructs the input port 50i to filter are those that include certain header information determined to be unsupported. Examples of classes whose packets would be forwarded at layer 2 would include a fragmented UDP flow and a class indicating that the header information is unknown. A fragmented UDP operates using layer 2 information because after the first packet, the fragmented packets do not include all relevant information from the layer 4 header information, UDP ports for example. Layer 2 forwarding would be optional for address independent classes depending on the particular class.

The merge logic 66 instructs the input port 50i to use layer 3 flow information for TCP or non-fragmented UDP flows. Flows are those packets forwarded within the subnet to which the multi-layer network element 12 is attached and require no header modification on forwarding. Routes, on the other hand, are packets coming from sources outside the subnet or destined to addresses beyond the subnet such that the header information must be modified prior to forwarding by the multi-layer network element 12. In a preferred embodiment, instructions to forward the packet as a layer 3 route come from the merge logic 66 when the class indicates that the packet is of a class hardware routable IP. In other words, the destination of the incoming packet is recognized by the class logic 60 of the multi-layer network element 12, and the multi-layer network element 12, must then forward the packet to the next hop destination, which is determined by routing protocols. Those skilled in the art can easily recognize from the invention other situations where such a type of result would be desired.

One feature of the invention is the ability to bridge flows, that is, use the forwarding memory to quickly forward layer 2 packets using layer 3 functionality through the network element 12. Certain flows are particularly suited for this type of activity and include static flows, self-detecting flows, and flows set up by reservation protocols, such as RSVP. Static flows are those set up in advance by the network element 12 operator and define layer 3 functionality for selected layer 2 network traffic and are not subject to aging. Self-detecting flows are a function of the type of application.

Initially, these flows are bridged with no layer 3 functionality because no layer 3 entry matches. The packet header is sent to the processor 32 for examination. The processor 32 analyzes the packet and based on programmed heuristics determines whether and how to create a layer 3 entry in the forwarding memory 42 for the packet type. For example, a "ping" packet would not warrant a layer 3 flow entry because it is, at best, a transient packet.

Protocols like RSVP work to reserve certain service features of the network and signal that a number of packets will follow this same path. In this case, it serves the application using the reservation protocol to forward at layer 2, but add layer 3, or more, functionality like priority to ensure the required class of service through the multi-layer network element 12.

Figure 6:
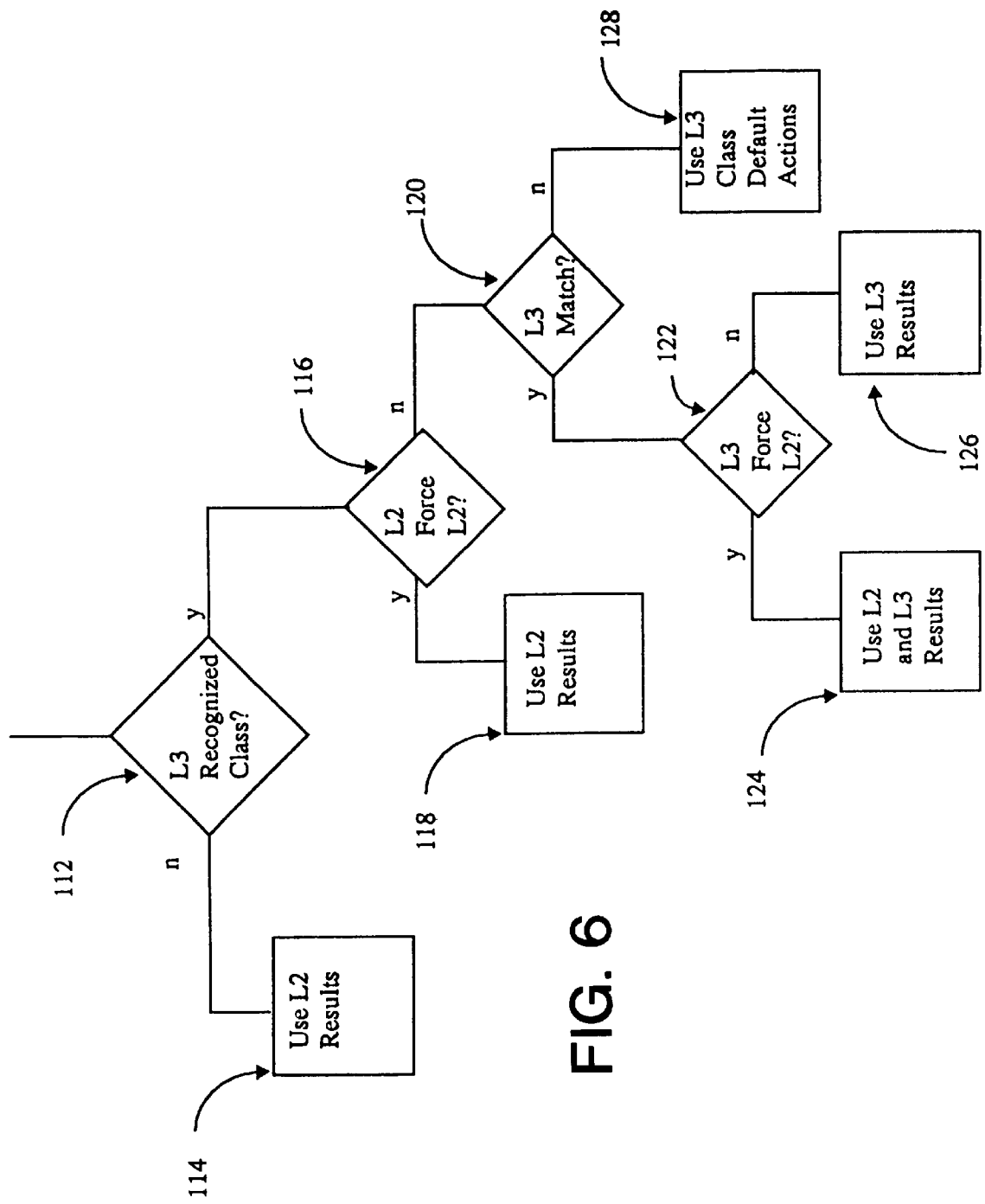
FIG. 6 illustrates the process used in determining which information dictates a packet's path through the multi-layer network element.

FIG. 6 illustrates preferred results produced by the merge logic 66 using information from the class logic 60 and the associated memory 42. Three results are presently preferred:

(1) use the layer 2 forwarding results; (2) use the layer 3 forwarding results; and (3) use the layer 3 results while using the layer 2 topology. In some instances, there may be an identified class, but no matching entry in the forwarding memory 40, in this instance, the default actions for the class are used. Note that the use of layer 3 default results can be considered a subset of using layer 3 forwarding results.

Default results may be set for packets of a class type to provide protection such as that provided by firewall technology. In a firewall application, the multi-layer network element 12 would be programmed to direct any packet of a defined class to the processor 32 for subsequent processing.

Referring to FIG. 6, if the class logic 60 determines that the packet is of an unrecognized class (step 112), then the packet is acted on using the layer 2 results (step 114). If the packet's class is recognized (step 112) and the associated memory 42 or class logic 60 indicates that a layer 2 result should be forced (step 116), then the layer 2 results are used (step 118) regardless of any other information.

If no layer 2 results are forced as a result of the layer 2 search (step 116) and there is a match of the layer 3 key (step 120), then the layer 3 information is checked to determine whether the layer 3 information forces a layer 2 port decision (step 122). If the layer 3 information forces a layer 2 forwarding result, then the output port is determined by the results of the layer 2 search, however, any other information found in the results of the layer 3 search are applied (step 124) such as QoS factors. If the layer 3 results do not call for forcing a layer 2 forwarding result, then the layer 3 results are passed on to the input port 50*i* (step 126). If there is no layer 3 match in step 120, then the default actions for the class generated by the class logic 66 are passed to the input port 50*i* (step 128). It is also contemplated that a packet is sent to the processor 32 without being forwarded to any output port 56 by the input port 50*i* when using L3 class default action.

Thus, if the class is recognized and the layer 3 search matches an entry, then the actions defined by the layer 3 search govern the instructions to the input port 50*i*, even though that might mean that the layer 2 output port results are used. If not, the packet is treated using layer 2 results and the packet or the packet's header might be sent to the processor 32 for subsequent processing of the layer 3 information, if desired.

If the information coming out of associated memory 42 for a layer 3 match indicates a force layer 2 result, then packet forwarding is done using the layer 2 results, but any information relating to quality of service may still be implemented on a layer 2 forwarding decision. In this way, the multi-layer network element 12 may add additional functionality above and beyond normal layer 2 bridges by allowing quality of service factors to be applied to layer 2 bridging or routing within the same subnet or VLAN.

Accordingly, the input port 50*i* presents to the forwarding logic 52 the header of the received packet and its port designation. The output of the forwarding logic 52 is a function of the header information and the arrival port and indicates whether the input port 50*i* should store the packet in the packet buffer memory 44 in cooperation with the packet memory manager 54; whether any priorities should be associated with the packet on a particular output port 56*i*; and whether the input port 50*i* should make any modifications to the packet such as header replacement prior to passing the packet to the packet buffer memory 44. Thus, an output port 56*i* need not make any modifications to the header except for inserting its MAC address and computing a new packet checksum when routing unicast or multicast packets, for example.

The layer 2 and layer 3 information in the forwarding memory 40 are independent of each other as applied to searches although some information contained in a layer 2 entry may be duplicated in a layer 3 entry. Additionally, a layer 3 entry may also contain some layer 4 information such as the UDP or TCP ports. Those skilled in the art would readily recognize other features that could be added by including other information from other header layers or the packet body and such are considered to be within the scope of this invention. After both the layer 2 and layer 3 searches are completed, the merge logic 66 determines what actions the input port 50*i* should do to the packet.

Any layer 2 learning of source addresses, or changes that might occur as a result of a topology change are communicated to the processor 32 as part of the layer 2 source search. As mentioned earlier, the layer 2 infonnation may include tagged information like that used to support virtual LAN (VLAN) information. When and, if used, the VLAN information helps to restrict layer 2 flooding to only those ports associated with a particular VLAN or specific tagging.

Each entry in the associated memory 42 may contain information relating to the following outcomes. The entry includes an indication of the output ports 56 for the packet including whether all or portions of the packet should be sent to the processor 32. The entry allows for more than one port 56*i* to be specified, if needed, to support for example multicast addressing, for example. The entry also includes a priority for the packet which maps into the number of output queues which may be present on an output port 56. The entry also includes an indicator for which output ports 56 should use Best Effort in transmitting the packet. Best Effort implies that no guarantee on the packet's transmission or QoS is provided. Those skilled in the art will easily recognize that the invention applies equally well to other QoS as well.

The entry may also indicate whether a new tag should be applied to an outgoing packet when, for example, whether routing between VLANs requires an outgoing tag different from the incoming tag, and what that tag should be, if necessary.

The entry also contains information relating to source and destination aging. Source aging information indicates whether the source is active or not. In a preferred implementation, this information is updated by the forwarding logic 52 every time the layer 2 source address is matched. The information implements in accordance with IEEE standard 802.1d type address aging. Destination aging in the network element 12 indicates which layer 2 and layer 3 entries are active. The information for an entry is updated every time an entry is matched, either by a layer 2 destination search or a layer 3 match cycle for the entry.

The entry also provides for whether layer 2 results should be used for forwarding by the input port 50*i*. As mentioned above, the layer 2 information may be forced for a layer 3 entry but in addition to the layer 2 forwarding information, layer 3 functionality may be added to the layer 2 forwarding.

The entry may also define a static entry. A static entry is not subject to layer 2 learning and is never aged.

Entries for layer 3 may include additional information. The entry may indicate that only the first 64 bytes of the packet should be sent to the processor 32 for subsequent processing. The entry may indicate whether the packet is part of a multicast routing. If so, then the output port 50*i* should decrement the header checksum, forward the packet to the indicated output ports 56, and indicate that the output port 561 need to replace the layer 2 source address of the packet the output port 56*i* 's MAC address. Other types of header modifications will be readily apparent to those skilled in the art to implement proper routing.

The entry in the associated memory 42 may also include the next hop destination address to be used to replace the incoming destination in unicast routing. In a unicast route, the incoming packet would have had its destination address as the multi-layer network element 12.

The merge logic 66 must wait for the results of the searches of the forwarding memory 40 done by the L2 logic 62 and the L3 logic 64. In the preferred embodiment, the layer 2 and layer 3 information are stored in the same forwarding memory 40, however, they could be stored in separate memories. As stated earlier, the preferred embodiment has the forwarding memory 40 limited to storing the information used by the L2 and L3 logics that match the fields of the key to reduce the size of the forwarding memory. As such, the associated memory 42 stores additional information about the entries. Each entry in the forwarding memory 40 points to a corresponding entry in the associated memory 42, the contents of which the associated memory 42 provides to the merge logic 66 to makes its forwarding decisions.

Figure 7:
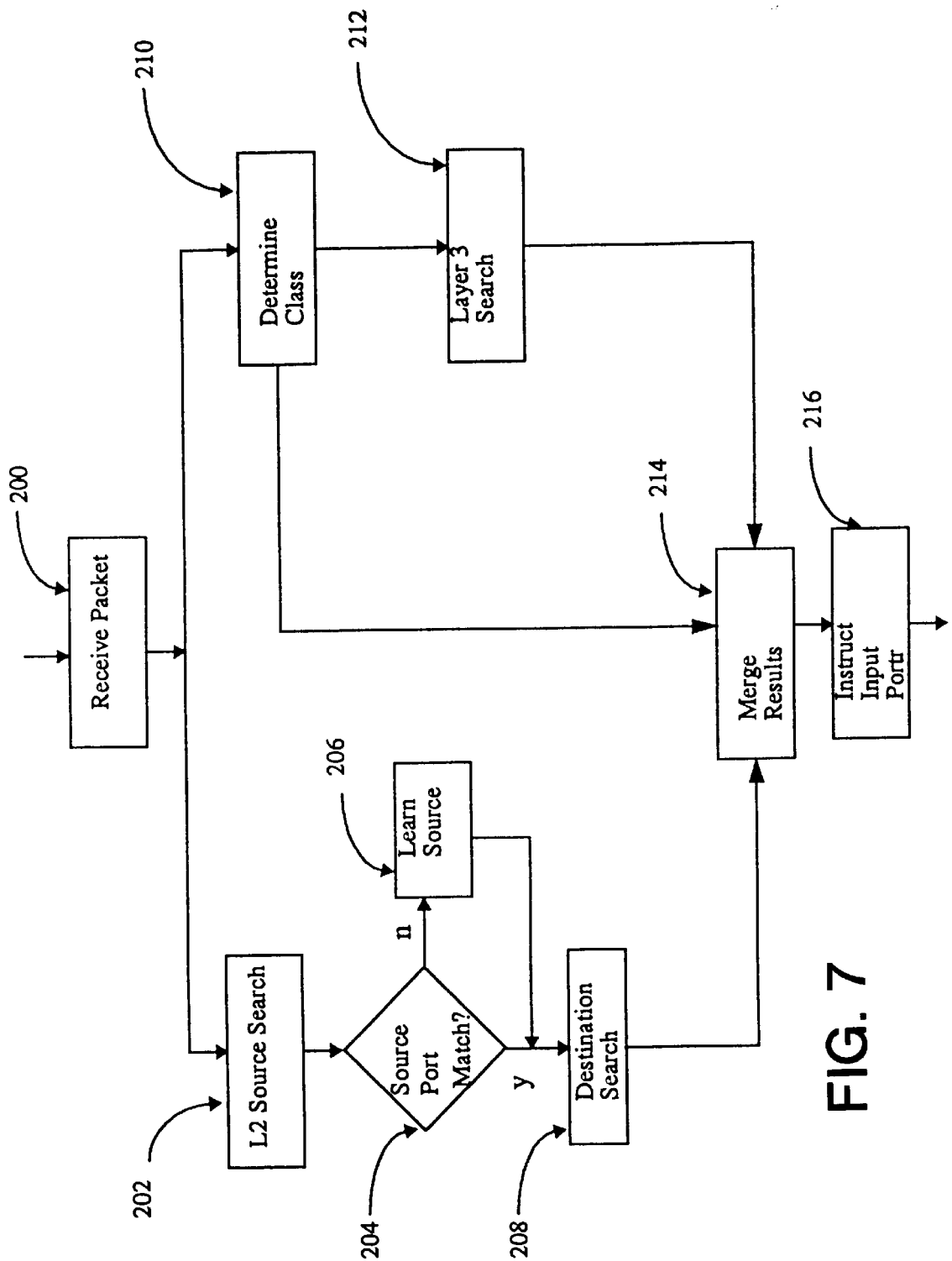
FIG. 7 illustrates the information dependency in determining how to forward a packet out of the network element.

FIG. 7 illustrates the steps occurring in the forwarding logic 52. While the FIG. 7 illustrates the preferred embodiment of the operation of the forwarding logic 52, those skilled in the art will immediately recognize other equivalent ways to accomplish the same task. Information is received at the forwarding logic 52 from the input port 50 (step 200). On one path, the L2 logic 62 determines the necessary information for a layer 2 search and carries out that search against the forwarding memory 40 (step 202). The L2 logic 62 and forwarding memory 40 determine in step 204 whether there was a matching entry for the source of the packet (step 204). If the source address is not in the forwarding memory 40, then the source address is learned (step 206). To learn the source address, the L2 logic 62 and the forwarding memory 40 ensure that an entry is placed in the forwarding memory. A signal is sent to the processor 32 to examine the new information.

If the source address was already in the forwarding memory 40 and matched to the input port 50 of arrival, then the L2 logic 62 attempts to match the destination address to the forwarding memory 40 (step 208). If the source address was not in the forwarding memory 40 or the source address was in the memory but at a different port, then the source address and port combination is learned in step 206 prior to attempting a destination search in step 208.

In the other path from step 200, the class logic 60 determines the class in step 210. After the class logic 60 has determined the class and passed this onto the L3 logic 62, the L3 logic attempts a match against the forwarding memory for the layer 3 entry (step 212).

In step 214, the merge logic 66 uses information from the L2 search of step 208, if there was one, the class logic results from step 210, and the layer 3 search results from step 212 to make the appropriate forwarding decisions based on the criteria of FIG. 6. Once the merge logic 66 has determined the appropriate forwarding decision in step 214, the results are passed to the output port 50*i* (step 216).

FIG. 7 illustrates the flow proceeding down two paths. Because the layer 2 and layer 3 searches are independent, everything but the actual memory search may be pipelined or accomplished in parallel. In a preferred implementation, the processing by the class logic 60, the L2 logic 62, and L3 logic 64 may proceed in a parallel or pipelined fashion except where dependencies prevent such action. For example, the L3 logic 64 requires the output of the class logic 60 to create the search key for the layer 3 search and the merge logic 66 requires that the layer 2 and layer 3 searches be finished to merge the results according to FIG. 6.

In another embodiment, however, the L2 information and the L3 information may be in separate memories. In this case the L2 and L3 searches may occur simultaneously.

After the merge logic 66 determines the actions on the packet, the input port 50*i* makes write requests to the packet manager 54 if the packet is not to be filtered, or dropped. The packet need not be received in its entirety before the input port 50*i* makes write requests to the packet manager 54. The input port 50*i* passes to the packet manager 54 the address where the incoming portion of the packet is to be stored, the number of output ports 56 that the packet will be output, the priority of the packet, and then delivers the pointers to the appropriate output port(s) 56. The input port 50*i* receives pointers to free memory locations in the packet buffer memory 44 where the packet may be placed. Preferably, the input port 50*i* has obtained a pointer from the packet buffer manager 54 prior to making write requests.

The output port 56*i* stores the pointers in output queues for packet transmission. When a queue presents a pointer for transmission, the output port 56*i* requests the contents stored at the pointer address from the packet manager 54 and transmits the contents out of the multi-layer network element 12 on the corresponding network element port 38. The packet manager 54 keeps track of whether all of the output port 56 using a particular pointer have transmitted the contents associated with that pointer, if so the memory space is freed for future use.

Packets in the network element 12 are buffered at each output port 56*i* before the packet is transmitted across the physical medium to the next or final destination. Queueing both at the input port 50*i* and the output ports 56*i* are based on pointers. Each of these pointers points to a storage location in the packet buffer memory 44 where the packets are stored. The pointers are passed from the input port 50*i* to the appropriate output ports 56. Each output port 56*i* requests the contents of the pointed-to location from the packet memory manager 54 when a packet is to be transmitted. For multicast packets, only one copy of the packet is kept in the packet buffer memory 44 along with a count of the number of output ports 56 to which the packet has to be sent.

Each output port 56*i* has a plurality of output queues Qi. In the preferred embodiment, each of the output ports 56*i* includes three queues. However, the concepts embodied in this invention are not limited to any particular number of output queues. While one skilled in the art will recognize that hardware-implemented queues can be implemented in various way, the preferred embodiment includes, at each output port 56*i*, a single physical queue and this is divided into n logical queues, preferably 3.

Figure 8:
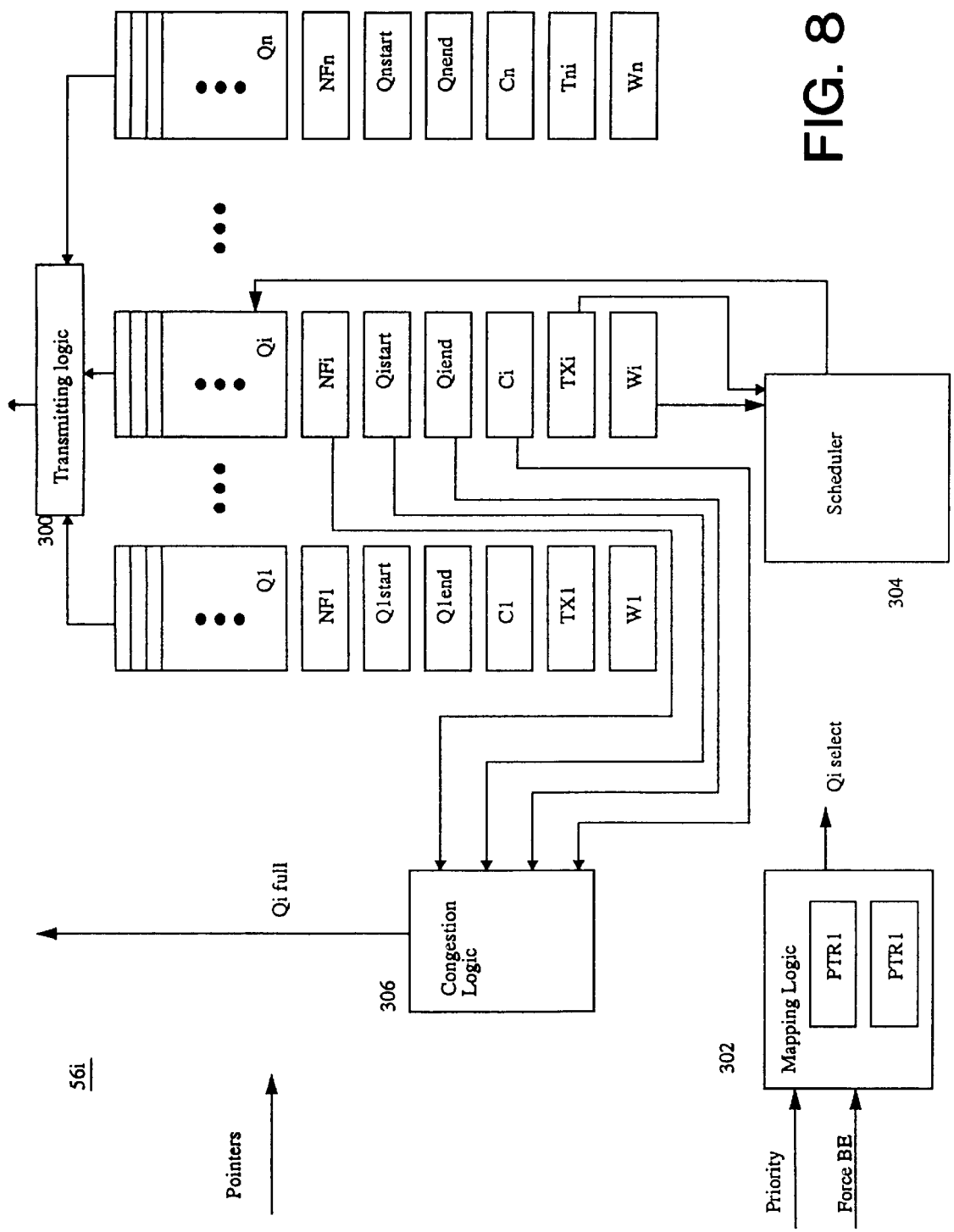
FIG. 8 illustrates an output port in more detail.

FIG. 8 illustrates a more detailed view of an output port 56*i* including a logical view of the output queues Qi. FIG. 8 illustrates output queues Q1 . . . Qi . . . Qn. Each of the queues Qi is connected to a transmitting logic 300 that transmits the packets pointed to by the queue Qi when instructed.

Each queue has a pair of pointer registers to indicate the beginning and the end of the queue. For each queue Qi, Qistart stores the location of the beginning Qi; and Qiend stores the location of the end of the queue Qi.

The maximum number of pointers that is allowed per output port 56i is limited by the hardware storage, and in the preferred embodiment this is 1K. The concepts embodied in the invention, however, are not limited to any particular maximum number of storage locations. While the maximum number of pointer storage locations is limited for a particular implementation, the size of the queues that share the maximum number of storage locations is variable. For example, in the preferred embodiment, the number of storage locations in the physical queue is limited to 1K, but the size of the n queues themselves need only aggregate to 1K. In this way, each of the logical queues Qi may be of different sizes.

The relative distribution of the 1K storage locations among the logical queues, Qi, is programmable on a per-output-port 56i basis by the processor 32. The relative distribution can be changed by the processor 32 at any time (depending on the traffic flow) and the changes will take effect as soon as the affected queue regions are empty and the pointers can be reassigned.

Providing multiple output port queues per output port 56i enables traffic mapping to required quality of service (QoS) type functions and other factors. The network element 12's flexibility in queueing is given by programmability on a per-output-port 561 basis for: (1) classification into the number of queues Qi at output port 56i; (2) scheduling transmission from the queues; and (3) Qi behavior upon congestion.

Classification of packets into different queues results from global priority information output to the input port 50i by the forwarding logic 52, which the input port 50i passes to the output port 56i. Global priority information is associated with each packet and is present as a part of the associated data in the associated memory 42. Global priority information may be mapped from the priority information present in the VLAN tags and would be based on the IEEE 802.1Q standard.

Output ports 56i use the global priority information to determine to which queue Qi a given packet will be forwarded as long as Force BE (Best Effort) infonnation, also in the associated memory 42 and associated with the packet, does not indicate a Best Effort override of the global priority information. If the Force BE information does indicate an override, then that packet will be sent to the low priority queue. The implementation of the Force BE allows forcing Best Effort on a per-output-port 56i basis. Preferably, this is done by having a Force BE field in the associated memory 42 associated with an entry, the field having an indicator for each output port 56i. In the preferred embodiment, this is implemented using a single bit per output port 56i.

Included in the output port 56i is a mapping logic 302 that translates the global priority information into a queue selection signal for storing the pointer from input port 50i.

The global priority information is contained in a associated memory 42 entry field of three bits. The three bits are passed to the mapping logic 302 which outputs the queue selection signal. The three global priority bits associated with the packet entering the output port 56i from the buffer memory 44 are mapped by the mapping logic 302 into two local priority bits by the mapping logic 302, in order to determine the appropriate output queue for the packet, and then the mapping logic 302 generates the queue selection signal. This mapping is determined by two programmable queue priority threshold values found in the mapping logic 302. A first programmable priority threshold register PTR1 stores a first threshold value and a second programmable priority threshold register PTR2 stores a second threshold value. The mapping is programmable by the processor 32 by changing the values in the threshold registers, PTR1, PTR2.

The mapping of the three-bit global priority into local two-bit priority using the threshold values for Q1 to Qn, where n=3, is as follows:
 If p<PTR1 then global priority=01
 If p>=PTR1 and p<PTR2, then global priority=10
 If p>=PTR2, then global priority=11
where p is the value of the global priority field.

| 00 ----- | Unused (Reserved) | |
|---|---|---|
| 01 ----- | Q1 -----> | Low priority, BE queue |
| 10 ----- | Q2 | |
| 11 ----- | Q3 -----> | High priority queue |

While the mapping above has been described for the preferred embodiment, those skilled in the art would readily recognize variations that would accomplish the result of mapping any global priority associated with a packet to multiple number of queues in an output port 56i.

The output port 56i also includes a scheduler 304. The goal of the scheduler 304 is to allocate fixed rates to each queue Qi for transmission within output port 56i. Because the scheduler 304 is associated with a particular output port 56i, the network element 12 is capable of programming different schedules for each output port 56i.

In the preferred embodiment, the network element 12 supports both strict priority and weighted round robin priority schemes. Each queue Qi in each output port 56i has associated with it three programmable registers which contain the weights to be used for their associated queue.

For the sake of simplicity, the following discussion and FIG. 8 illustrate relationships only for queue Qi. The discussion applies directly to all of the queues. Also, throughout this discussion we assume three queues although, as mentioned above, the extension of this scheme to more queues is straightforward.

In implementing the strict priority scheduling method, the scheduler 304 will not service the lower priority queues as long as there are packets in the higher priority queues. This implies that the highest priority queue can potentially starve the lower priority queues. The network element 12 also provides a weighted round robin method as an alternative.

In the weighted round robin method, each queue Qi has an associated weight, stored in an associated weight register, Wi, storing the number of packets to be transmitted during a round. The scheduler 304 polls each queue Qi and serves Wi packets before servicing queue Q(i+1), the next queue, in the round. While illustrated as a number of packets, a given weighted Wi is also envisioned alternatively as the number of bytes. This scheme attempts to give each queue Qi a rate proportional to its respective weight. However, there is a trade-off between the flexibility and the packet delay associated with queue Qi, since a large range of weights leads to large service cycle times, and consequently large worst-case packet delays.

To achieve better performance, the scheduler 304 runs a weighted round-robin scheme according to a frame structure. The scheduler 304 attempts to enforce the rates over several polling rounds that comprise a frame. Frame length can be made much smaller than the cumulative sum of the weights of the queue Qi within the output port 56i. This has the advantage of reducing the worst-case delay.

As an illustrative example of the framing method, wherein the output port 56i includes three queues Qi, if queue Q1 has a weight of 2, queue Q2 has a weight of 4, and queue Q3 has a weight of 6, a normal round would service 6 packets of queue Q3, then 4 packets of queue Q2, and finally 2 packets of queue Q3. Using the frame approach, a round could be made up of two frames. Accordingly, the round would service frame 1, i.e., service 3 packets of queue Q3, 2 packets of queue Q2, and 1 packet of queue Qi, and then frame 2, i.e., service 3 packets of queue Q3, 2 packets of queue Q2, and 1 packet of queue Q1. As mentioned above, the choice of the number of frames is programmable and based on desired results.

Packets are serviced non-preemptively which means that a packet's transmission is not interrupted. A transmit register, TXi, is associated for each Qi. The TXi registers hold the number of bytes that can be transmitted from this queue in the current round, or frame, if framing is being used.

The scheduler 304 services queue Qi and decrements the transmit register TXi register according to the number of bytes transferred until the value of this register is less than or equal to zero. The scheduler 304 then starts processing queue Q(i+1) in the round, or frame, and also updates the TXi register of just serviced queue Qi by adding to the register TXi a quantum of bytes as represented by the value in the Wi register. The TXi registers count below zero in order to align the number of bytes transmitted to the packet boundary. That is, a queue Qi may finish transmitting a packet even if the number of bytes to finish transmitting the packet causes the value in the TXi register to drop below zero. This mechanism allows the scheduler 304 to take into account for queue Qi in the subsequent round, or frame, any overrun in the current round, or frame. When the value in the Wi register is added to the value in the TXi register, the number of packets that queue Qi may transmit during the next round, or frame, is reduced by the amount queue Qi went over its allocation for the current round, or frame.

Congestion may occur in the network element 12 when resources are not available for a packet. Some of the resources necessary to switch packets are input buffers, space in the packet buffer memory 44, and output port 56 queue locations. Input buffers are assigned to the packet upon arrival at the network element 12, while output port queue entries are assigned when moving packets into output ports for transmission. If the input buffers are not available for storing the packet at the input port 50 or no pointers are available to store the packet in the packet buffer memory 44, the packet will be discarded. A congestion logic 306 handles congestion in the output port 56$i$ for each queue Qi.

If an output port queue Qi is full, packets are discarded by not storing the pointer in queue Qi, however, the other queues may not be full. Waiting for the queue Qi to become full before dropping packets may not be desirable as this leads to tail drop behavior. Also, if only packets are discarded when the queue Qi is full, and if one flow having previously negotiated a particular QoS is exceeding its negotiated parameters while others are not, it is likely that well-behaved packets may be dropped continuously while the misbehaved flow will be transmitted.

To balance all the flows going out of a particular queue Qi, discarding of packets may begin even before the queue Qi is full. Each queue Qi has an associated congestion register Ci that holds a threshold value which is less than the queue size. When the number of queue Qi entries reaches the threshold value, a discard policy is applied. Additionally, in the preferred embodiment, when the queue Qi becomes full, a "queue full" interrupt is generated.

The queues Qi may at some time contain pointers to packets that are part of a plurality of negotiated flows, such as those set up using a negotiated service-based protocol, such as RSVP. If admission control is properly done by the processor 32 in setting up the entries in the forwarding memory 40 and associated memory 42, and if all the flows are generally following their traffic specifications, a queue-full interrupt suggests that one of the flows is misbehaving and exceeding its assigned reservation.

In an attempt to detect misbehaving flows, all the flows that are destined for the particular queue Qi causing the queue full interrupt are monitored one at a time to ensure that they are confirming to their reservations. This scheme detects misbehavior of flows over a period of time. The processor 32, in response to a queue-full interrupt, sets a count indicator in the associated memory 42 for an entry directing packets to the output port 56$i$ associated with the queue Qi. The processor 32 uses its knowledge of the contents of the forwarding memory 40 and the associated memory 42 to determine which flows, that is, entries in the associated memory 42, are directing packets to any queue Qi. Alternatively, desired aggregate flow may be counted by setting the count indicators multiple entries in the associated memory 42.

The indicator causes a shared packet count register PCR 67 (illustrated in FIG. 4) to be incremented every time the entry in the associated memory 42 is accessed, that is, every time a packet associated with that flow arrives at the network element 12 for which the count indicator has been set. The PCR is shared among all output ports 56. A single PCR 67 allows options for packet counting. For example, if the count indicator is set in only one entry in the associated memory 42, the PCR 67 will count only those packets matching that entry. The processor 32 could also set several entries' count indicators so that the PCR 67 may aggregate the packet counts for as many entries as have their count indicators set.

The processor 32 continues selecting flows for counting until the processor 32 finds the flow exceeding its parameters or having an unusual traffic pattern that might have caused the queue Qi to fill. When the misbehaving flow is found, the processor 32 causes the Force BE indicator (described earlier) in that entry in the associated memory 42 for that particular output port 56$i$ to be set. In practice, this implements a strategy for punishing (i.e., assigning a lower priority to a misbehaving flow) a flow that is exceeding its negotiated value, so that other packets using the output port 56$i$ are not adversely affected by the misbehaving flow. Since the misbehaving flow's packets are sent to the lowest-priority queue, the BE queue, the chances that its packets will be dropped is increased. If the best-effort queue, i.e., the queue Qi having the lowest priority, overflows, then the packets are discarded.

The congestion logic 306 uses a Random Early Discard (RED) algorithm to randomly discard packets attempting to enter the queue Qi after the queue's programmable threshold register Ci associated with each queue Qi is met or exceeded. The discard policy is preferably applied separately to each queue Qi. The processor 32 programs the marking probability of the discard algorithm depending on the traffic class and the flow. When the number of packets queued in queue Qi meets or exceeds the number is the register Ci, the packets entering queue Qi are randomly dropped. The dropped packets may be transmitted to the processor with an indication that the processor 32 should analyze the situation.

When a sufficient number of packets from the same flow is being dropped, there is a higher than normal probability that that flow is sending excess traffic. The priority of such a flow is lowered via the Force BE field described earlier.

In addition to providing forced priority levels via the BE Field in the associated memory 42, the entries in the associated memory 42 (in conjunction with their corresponding entry in the forwarding memory 40) may be configured to support different QoS. Various situations may call for desired QoS results. One example is allowing some layer 2 traffic within the subnet or across subnets to be given a higher priority. This might be done for traffic from a high-end server, for example.

QoS may also be configured for application specific traffic using a signalling protocol (such as RSVP), or based on some other criteria. The network element 12 preferably supports an approximation of several traffic types as defined by Internet Engineering Task Force (IETF) Integrated-Services Working Group. Traffic or flows which do not have any reservation or QoS associated with them are served as best-effort traffic. One skilled in the art will easily recognize how to apply the concepts of the invention to other traffic types.

In the preferred embodiment, the switching element 36 and all of its constituents, the forwarding memory 40, and the associated memory 42 all are implemented in hardware.

In an alternate preferred embodiment, the switching element 36 and all its constituents are implemented in hardware on an application specific integrated circuit. Equally contemplated, an integrated circuit could contain a hardware implementation of switching element 36, and any combination or portion thereof, of the processor 32, the processor memory 34, the forwarding memory 40, the associated memory 42, and the packet buffer memory 44.

A multi-layer network element has been described that combines the features of quick layer 2 bridge-type forwarding and combines it with the added functionality of layer 3 routing and QoS support to create an apparatus and method of its use to perform both layer 2 and most layer 3 forwarding decisions prior to the receipt of the next packet.

The foregoing description of the preferred embodiments of the multi-layer network element has been presented for purposes of illustration and description. It is not intended to be exhaustive or to limit the invention to the precise form disclosed, and modification and variations are possible in light of the above teachings or may be acquired from practice of the invention as disclosed. The embodiments were chosen and described in order to explain the principles of the invention and its practical application to enable one skilled in the art to utilize the invention in various embodiments and with variation modifications as are suited to the particular use contemplated. It is intended that the scope of the invention be defined by the claims appended hereto, and their equivalents.

What is claimed is:

1. An apparatus for detecting and handling queue congestion in an output port of a multi-layer network element comprising:

a central processing unit (CPU);

a switching element coupled to the CPU and configured to output packets to a network through the output port, the switching element including:

at least one output queue having storage locations for packet pointers, each pointer configured to point to portions of a packet to be transmitted on the network, associated with the output port, and wherein the number of storage locations is variable, a start register configured to store a pointer to the storage location at the front of the queue, an end register configured to store a pointer to the storage location at the end of the queue as determined by the number of storage locations, a next-free register configured to store a pointer to the next available storage location, wherein packet pointers are stored in the output queue beginning at the location pointed to by the start register and the next-free register is incremented as the next available storage location moves toward the second pointer, a programmable threshold register configured to store a threshold pointer to a storage location between the location represented by the start register and the location represented by the end register, threshold logic configured to output a congestion signal when the value in the next free register represents a storage location logically located between the location pointed to key the threshold register and including the storage location pointed to by the end register, random discarding logic configured to randomly select packets to discard in response to the signal, so that once the threshold is exceeded, incoming packets are randomly discarded, capacity logic configured to output a queue full signal to the CPU when the value in the next free register is equal to the value in the end register, a memory having at least one entry configured to store information about forwarding decisions for the packet, wherein the entry is adapted to indicate whether packets associated with that entry should be counted, memory access logic configured to access the entry when an incoming packet associated with that entry arrives at the switching element, and a packet counter configured to count the number of times the entry is accessed, to represent an entry bandwidth; and a computer program mechanism coupled to the CPU configured to compare the contents of the packet counter to a reservation-based protocol negotiated value for lowering a priority of any future packet associated with the entry and destined for the output queue.

2. An apparatus for queue scheduling in a network element comprising:

at least one output port configured to output packets, each packet having a byte length;

at least two queues associated with each output port, configured to queue packets to be output at each output port;

a weight register associated with each queue and adapted to receive a value representing a weight number;

weighting logic for generating the weight number for each queue;

transmitting logic at each output port configured to transmit packets identified in each queue according to a queue select signal and responsive to a done signal;

scheduling logic at each output port configured to select one of the queues and to generate the queue select signal to the transmitting logic to indicate which queue will be transmitting;

counter logic, at each output port, associated with the counters configured to decrement the weight register equal to a number of bytes transmitted by the transmitting logic; and reloading logic configured to determine the number of packets transmitted after the done signal and to place in the weight register a value equal to the weight number minus the number of packets transmitted after the done signal.

3. The apparatus of claim 2, wherein the scheduling logic is configured to respond to the done signal and the transmitting logic to select a next transmitting queue.

4. The apparatus of claim 2, wherein the scheduling logic is configured to select a next transmitting queue at a time prior to the zero logic generating the done signal.

* * * * *